United States Patent
Arbeiter et al.

(10) Patent No.: US 6,650,790 B1
(45) Date of Patent: Nov. 18, 2003

(54) DIGITAL PROCESSING APPARATUS FOR VARIABLE IMAGE-SIZE ENLARGEMENT WITH HIGH-FREQUENCY BANDWIDTH SYNTHESIS

(75) Inventors: James Henry Arbeiter, Hopewell, NJ (US); Roger Frank Bessler, Lawrenceville, NJ (US)

(73) Assignee: Nothshore Laboratories, Inc., Mercy County, NJ (US)

( * ) Notice: Subject to any disclaimer, the term of this patent is extended or adjusted under 35 U.S.C. 154(b) by 659 days.

(21) Appl. No.: 09/591,702

(22) Filed: Jun. 9, 2000

(51) Int. Cl.$^7$ ................................. G06K 9/40
(52) U.S. Cl. .................. 382/275; 382/252; 382/260; 382/274; 382/298; 345/611; 345/616; 358/3.26; 358/3.27
(58) Field of Search ................. 382/218, 219, 382/220, 221, 255, 256, 258, 260, 261, 262, 263–266, 268, 269, 272–275, 278, 282, 283, 295, 298, 299, 300, 252; 345/606, 611, 612, 613, 615–618, 626; 358/3.04, 3.06, 3.26, 3.27, 512, 525; 348/208.4–208.6, 240.99, 240.2, 347

(56) References Cited

U.S. PATENT DOCUMENTS

| | | | | |
|---|---|---|---|---|
| 5,018,078 A | * | 5/1991 | Urabe et al. | 345/561 |
| 5,086,497 A | * | 2/1992 | Horikawa et al. | 715/530 |
| 5,148,499 A | * | 9/1992 | Matsumura | 382/131 |
| 5,163,122 A | * | 11/1992 | Urabe et al. | 358/1.9 |
| 5,355,421 A | * | 10/1994 | Koyama | 382/266 |
| 5,600,347 A | * | 2/1997 | Thompson et al. | 345/667 |
| 5,795,685 A | * | 8/1998 | Liebmann et al. | 430/5 |
| 5,809,182 A | * | 9/1998 | Ward et al. | 382/298 |
| 5,907,640 A | * | 5/1999 | Delean | 382/276 |
| 6,184,892 B1 | * | 2/2001 | Toriu et al. | 345/427 |
| 6,191,793 B1 | * | 2/2001 | Piazza et al. | 345/582 |
| 6,512,841 B2 | * | 1/2003 | Yamada et al. | 382/128 |

* cited by examiner

Primary Examiner—Jayanti K. Patel
Assistant Examiner—Yosef Kassa
(74) Attorney, Agent, or Firm—George J. Seligsohn (57) ABSTRACT

Digital image processing apparatus, making use of both diagonal interpolators and a binary mask, for deriving a displayed enlarged image from an input image without introducing visible "staircasing", blurred edges and non-linear artifacts in the enlarged image to thereby produce a perceptually natural looking enlarged image that retains the "look and feel" of the input image.

14 Claims, 8 Drawing Sheets

DIGITAL PROCESSING APPARATUS FOR VARIABLE IMAGE-SIZE ENLARGEMENT WITH HIGH-FREQUENCY BANDWIDTH SYNTHESIS

BACKGROUND

1. Field of the Invention

This invention relates to digital image-processing apparatus for introducing synthesized high-frequency components in a variably-enlarged size of a displayed two-dimensional (2D) image, wherein (1) any undesired visible artifact in the displayed image is effectively eliminated and (2) the apparatus may be efficiently implemented on an integrated-circuit (IC) chip.

2. Description of the Prior Art

Known in the art are various digital-processing techniques for enlarging the size of a displayed image by introducing interpolated pixel values between pixel values of the original input image. Unfortunately, the introduction of such interpolated pixel values inherently results in the widening of image edge information, thereby causing the problem of undesirable blurring of edges in the displayed enlarged image. In order to overcome this problem, the prior art has developed different ways of synthesizing image components having higher spatial frequencies than the highest spatial frequency of the original input image, which synthesized image components are then added to the displayed image. In this regard, incorporated by reference herein are the teachings of U.S. Pat. No. 5,717,789 issued to Anderson et al. on Feb. 10, 1998, which is entitled "Image Enhancement By Non-Linear Extrapolation in Frequency Space", and its U.S. divisional Pat. No. 6,005,983 issued on Dec. 21, 1999.

More particularly, Anderson et al. strips off image 2D high frequencies using a low-pass filter (LPF) and subtraction process. The high pass component is then subjected to a non-linear function that amplifies the individual Laplacian values and clips or bounds them to a predefined threshold. Finally, this modified high pass component image is added back to the original image, or as an extension further expanded and interpolated by two and then added back to a matching expanded original image. The non-linear function creates modified amplitude values that reflect great slope at the zero-crossings of the Laplacian, thus synthesizing higher-order frequency terms. Their method is a rather simple non-adaptive approach that can readily be implemented in integrated circuit form, or software form for non-real-time applications. However, this Anderson et al. approach for synthesizing higher-order frequency terms inherently results in introducing undesired visible non-linear artifacts in the displayed enlarged image. This severely limits its utility, particularly in the processing of JPEG and MPEQ compressed images.

Further incorporated by reference herein are the teachings of our U.S. patent application Ser. No. 09/112539 filed Jul. 9, 1998, entitled "Synthetic Bandwidth Extrapolation for Images", which is assigned to the same assignee as the present application. In particular, this patent application discloses a non-linear, computationally-intensive digital process for deriving zooming images which employs local statistics within the image in order to optimally sharpen the image at each located image edge by adding a synthesized component having a higher spatial frequency than the highest spatial frequency of that edge in the original input image.

Additionally incorporated by reference herein are the teachings of our U.S. Pat. No. 5,355,328 issued Jul. 9, 1998, entitled "Resampling Apparatus Suitable For Resizing a Video Image", which permit an original input image to be either reduced or, alternatively, enlarged size in each of two spatial dimensions (2D) by a non-integer fractional factor.

In view of the foregoing discussion of the prior art, there is a need for a non-linear, relatively computationally-simple digital process for deriving zooming images which does not suffer from the introduction of undesirable visible non-linear artifacts in the displayed enlarged image, thereby producing a perceptually natural looking displayed enlarged image that retains the "look and feel" of the original input image.

SUMMARY OF THE INVENTION

The present invention is directed to improved structure for an image zoom module of a digital image processing apparatus that comprises at least one such image zoom module. The image zoom module is responsive to a digital two-dimensional (2D) Gaussian input image having a certain pixel density in each dimension thereof and a first frequency bandwidth applied thereto for deriving a digital 2D Gaussian output image having twice the certain pixel density in each dimension thereof and a second frequency bandwidth which is wider than the first frequency bandwidth. The improved structure comprises (1) 2D high-pass filter means responsive to pixels of the Gaussian input image being applied as an input thereto for deriving pixels of a first Laplacian image therefrom that has the certain pixel density in each dimension thereof and the first frequency bandwidth; (2) a first diagonal interpolator responsive to the pixels of the first Laplacian image being applied as an input thereto for deriving pixels of a second Laplacian image therefrom that has twice the certain pixel density in each dimension thereof and the first frequency bandwidth; (3) a phase gapper responsive to the pixels of the first Laplacian image being applied as an input thereto for deriving pixels of a binary-mask output therefrom that has the certain pixel density in which only an edge location in the first Laplacian image is defined by a pair of adjacent pixels of the binary-mask output having given non-zero amplitude values and all other locations in the first Laplacian image are defined by pixels of the binary mask output having zero amplitude values; (4) 2D expand means including 2D low-pass filter means responsive to pixels of the binary-mask output being applied as an input thereto for deriving pixels of a 2D low-passed filtered output image therefrom having twice the certain pixel density in each dimension thereof; (5) pixel-processing means comprising a multiplier for multiplying the algebraic values of corresponding pixels of the second Laplacian image from the first diagonal interpolator and the 2D low-passed filtered output image from the 2D expand means for deriving a third Laplacian image having the second pixel density and the second frequency bandwidth; (6) a second diagonal interpolator responsive to pixels of the Gaussian input image having the first pixel density and the first frequency applied thereto for deriving a Gaussian image having the second pixel density and the first frequency bandwidth as an output therefrom; and (7) a summer for adding the algebraic values of corresponding pixels of the third Laplacian image having the second pixel density and the second frequency bandwidth from the pixel-processing means and the Gaussian image having the second pixel density and the first frequency bandwidth from the second diagonal interpolator to derive the corresponding pixels of the 2D Gaussian output image having twice the certain pixel density in each dimension thereof and the second frequency bandwidth as the sum output from said summer.

DESCRIPTION OF THE PREFERRED EMBODIMENTS

Figure 1:
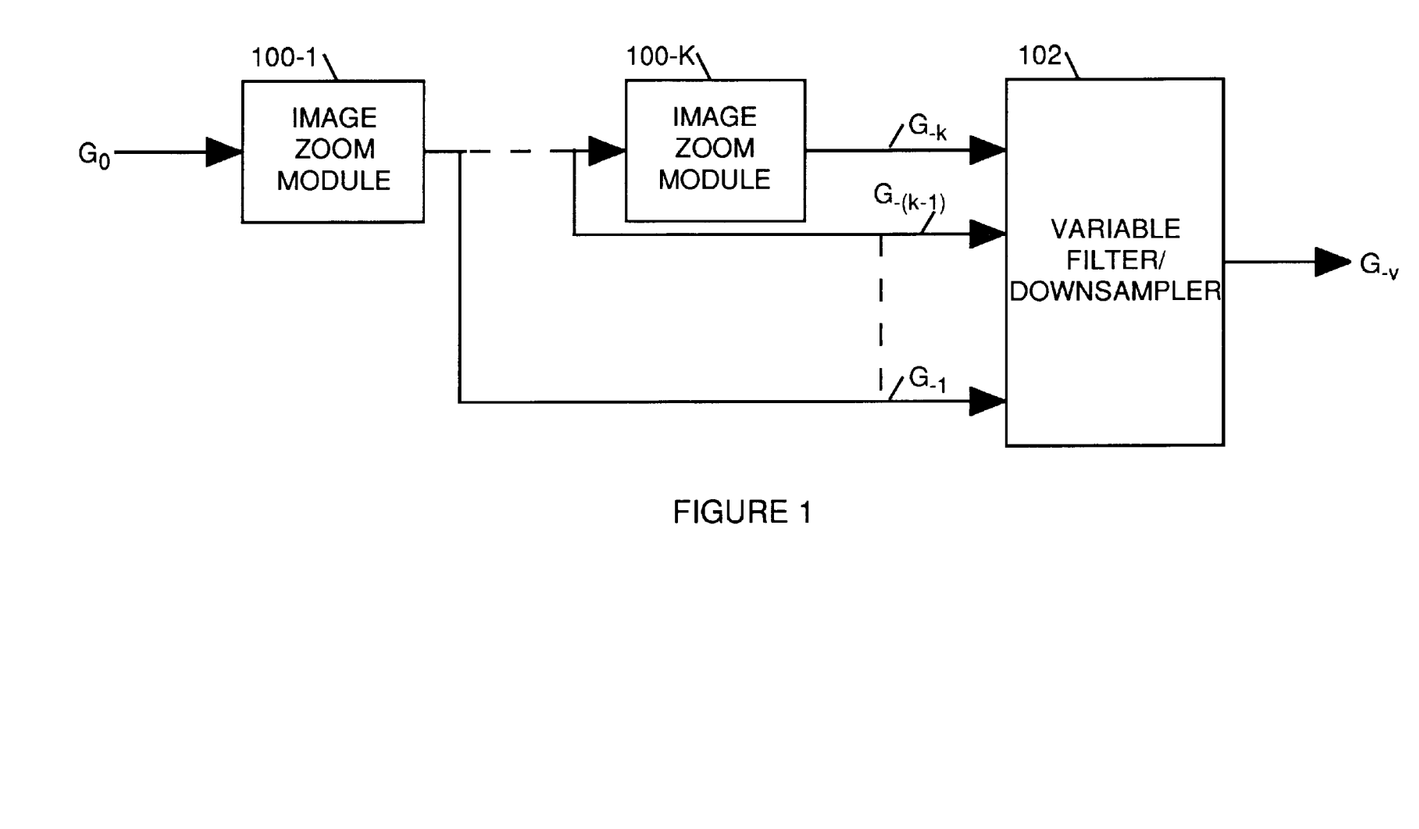
FIG. 1 is a block diagram of a variable filter/downsampler that digitally processes the output of a selected one of an ordinal series of K cascaded image zoom modules applied as separate inputs to the variable filter/downsampler.

Referring to FIG. 1, there is shown an ordinal series of K image zoom modules 100-1 ... 100-K (where K is a given plural number). A digital input image defined by a 2D Gaussian distribution of pixel values $G_0$ is applied as an ongoing input pixel stream to image zoom module 100-1. As known in the art, the digital input image may have been derived from an original analog image by means of an analog-to-digital (A/D) converter, not shown. Each of image zoom modules 100-1 ... 100-K is effective in increasing the high-frequency bandwidth of the 2D input image applied as an input thereto, while doubling the input image's pixel density in each dimension thereof. As indicated in FIG. 1, the image output $G_{-1}$ ... $G_{-(k-1)}$ of each of image zoom modules 100-1 ... 100-(K-1) in the ordinal series is applied as an image input to its immediately succeeding one of image zoom modules 100-2 ... 100-K in the ordinal series. Thus, the image output $G_{-k}$ from image zoom module 100-K is increased in pixel density in each of its two dimensions with respect to the pixel density of the image input $G_0$ to of image zoom module 100-1 by a factor of $2^k$. As further shown in FIG. 1, each of the respective image outputs bx;1$G_{-1}$ ... $G_{-k}$ from image zoom modules 100-1 ... 100-K is connected as a separate input to variable filter/downsampler 102. Variable filter/downsampler 102, which employs teachings of our aforesaid U.S. Pat. No. 5,355,328, is effective in reducing the pixel density in each of its two dimensions of a selected single one of the image inputs $G_{-1}$ ... $G_{-k}$ thereto by a selected fractional factor which has a value smaller than 1, but greater than ½, (with the selection of each of the single one of the image inputs and the fractional factor value being under automated and/or user control). In this manner, variable filter/downsampler 102 derives an output image $G_{-y}$.

A preferred practical maximum value for K in an IC-chip implementation of the cascaded image zoom modules of FIG. 1 is 3, so that, in this case, the 3 cascaded image zoom modules enlarge the input image size in each of its horizontal and vertical dimensions by a factor of $2^3=8$.

Figure 2:
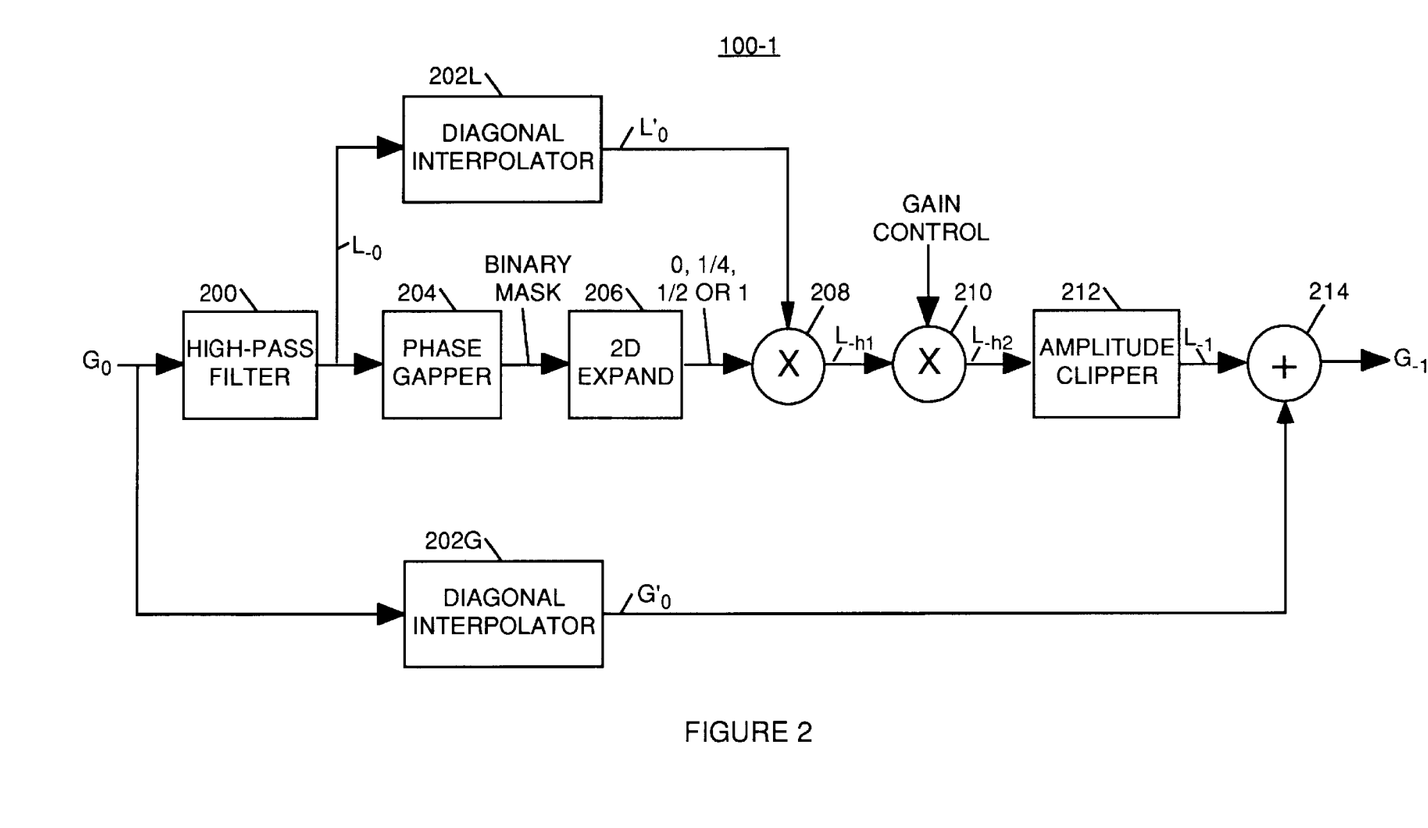
FIG. 2 is a block diagram of the structure comprising image zoom module 1 of FIG. 1.

FIG. 2 specifically shows the internal structure of image zoom module 100-1 together with the image $G_0$ applied as an input thereto and the image $G_{-1}$ derived as an output therefrom. Each of image zoom modules 100-2 ... 100-K in the series comprise internal structure which is identical to the internal structure of image zoom module 100-1, but has a different image applied as an input thereto and has a different image derived as an output therefrom (as is obvious from FIG. 1).

Referring to FIG. 2, there is shown high-pass filter 200, diagonal interpolators 202G and 202L, phase gapper 204, 2D expand means 206, multipliers 208 and 210, amplitude clipper 212 and summer 214. The digital pixel stream defining the Gaussian input image $G_0$ is applied (1) through high-pass filter 200 (which preferably comprises a separable 3-tap digital filter having the high-pass kernel function shown in FIG. 3a, discussed below in more detail, for each of the horizontal and vertical dimensions of input image $G_0$) as Laplacian $L_0$ image inputs to both diagonal interpolator 202L and phase gapper 204 and (2) directly as a $G_0$ image input to diagonal interpolator 202G. Although each of diagonal interpolators 202G and 202L could comprise a conventional prior-art linear interpolator typified in FIG. 4a, it preferably should be the interpolator typified in FIG. 4b which incorporates principles of the present invention (with both FIGS. 4a and 4b being discussed below in more detail). As indicated in FIG. 2, phase gapper 204 (which also incorporates principles of the present invention typified in FIGS. 5a and 5b discussed below in detail) converts only edge-defining pixel values of the Laplacian $L_0$ image input to phase gapper 204 into a binary pixel amplitude value of 1 in a so-called binary mask output therefrom and converts all other pixel values of this Laplacian $L_0$ image into a binary pixel amplitude value of 0 of the binary mask output therefrom. Therefore, each pixel amplitude value of this binary mask output from phase gapper 204, after being operated on by 2D expand means 206 (which preferably comprises a separable 3-tap filter having the low-pass kernel function shown in FIG. 3b, discussed below in more detail, for each of the horizontal and vertical dimensions of this binary mask output) may have a value of only 0, ¼, ½ or 1, as indicated in FIG. 2.

Each of the pixel values of the $L'_0$ oversampled image output from diagonal interpolator 202L (which has twice the pixel density in each of the horizontal and vertical dimensions of the $L_0$ image input thereto, but has the same high-frequency content as the $L_0$ image) has its high-frequency content increased to that of image $L_{-h1}$ by being multiplied in multiplier 208 by the corresponding pixel value of 0, ¼, ½ or 1, as the case may be, of the output from 2D expand means 206 (which has twice the pixel density in each of the horizontal and vertical dimensions of the binary mask input to 2D expand means 206). Then each pixel value of the $L_{-h1}$ image output from multiplier 208 is multiplied in multiplier 210 by an adjustable gain-control value which may be used to derive an altered $L_{-h2}$ high-frequency content image output therefrom. The adjustment may be either solely automated, solely under user control or, alternatively, some combination of automation that is modifiable under user control.

Figure 6A:
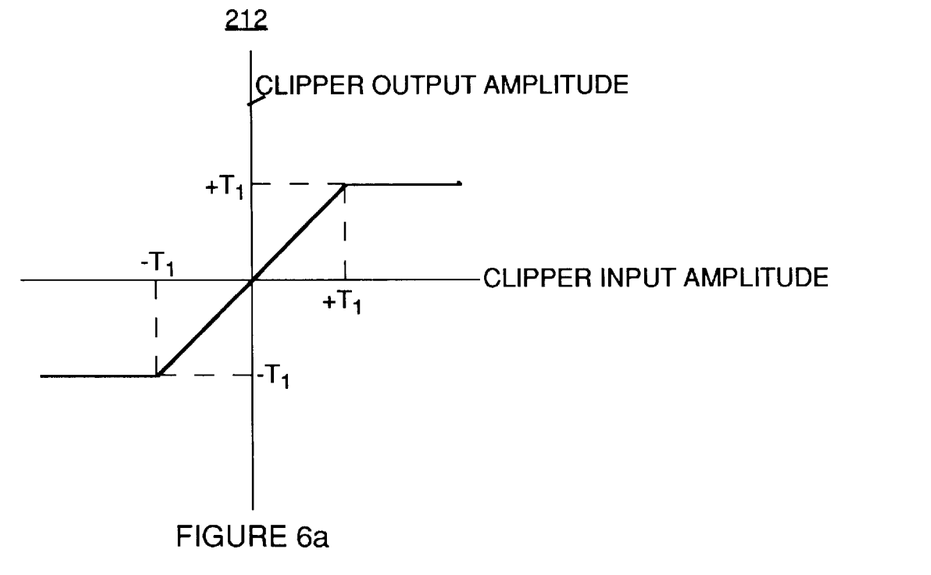
FIG. 6a is a graph of the output values as a function of input values of the amplitude clipper of FIG. 2 for the case in which the amplitude-clipper input has experienced unity gain and FIG. 6b is a graph of the output values as a function of input values of the amplitude clipper of FIG. 2 for the case in which the amplitude-clipper input has experienced greater than unity gain.
Figure 6B:
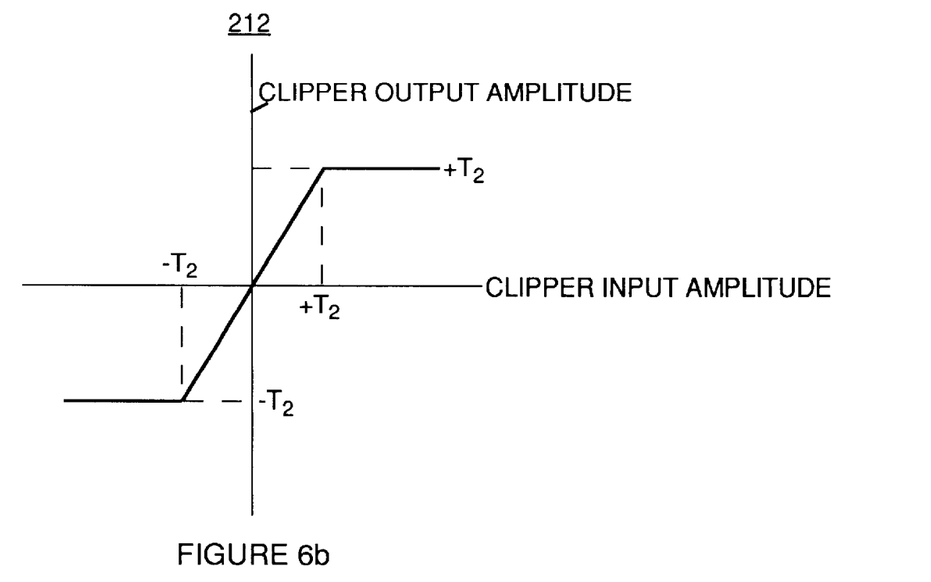

Each of the pixel values of the Laplacian image at the output from multiplier 210 is applied as an input to amplitude clipper 212, which may have the clipping output-input function shown in FIG. 6a or, alternatively, in FIG. 6b, to derive an output Laplacian image $L_{-1}$ having a further altered high-frequency content.

The amplitude clipped pixel values of the Laplacian image $L_{-1}$, at the output from amplitude clipper 212, are added to the corresponding pixel values of the oversampled Gaussian image $G'_0$, at the output from diagonal interpolator 202G, (which has twice the pixel density in each of the horizontal and vertical dimensions of the $G_0$ image input thereto, but has the same high-frequency content as the $G_0$ input image) in summer 214 to provide the pixel values of the Gaussian image $G_{-1}$, which constitutes the output from image module 100-1.

Figure 3A:
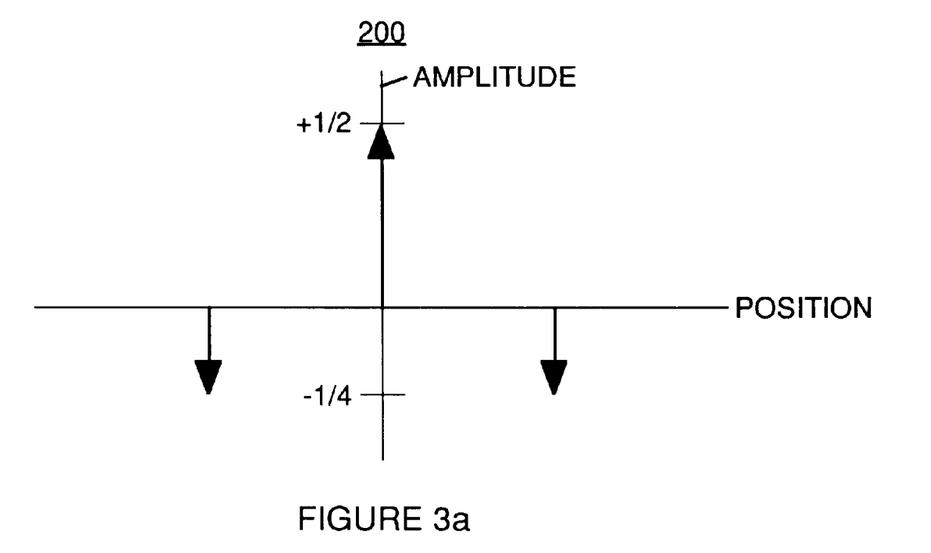
FIG. 3a shows the kernel function of a 3-tap high-pass filter.
Figure 3B:
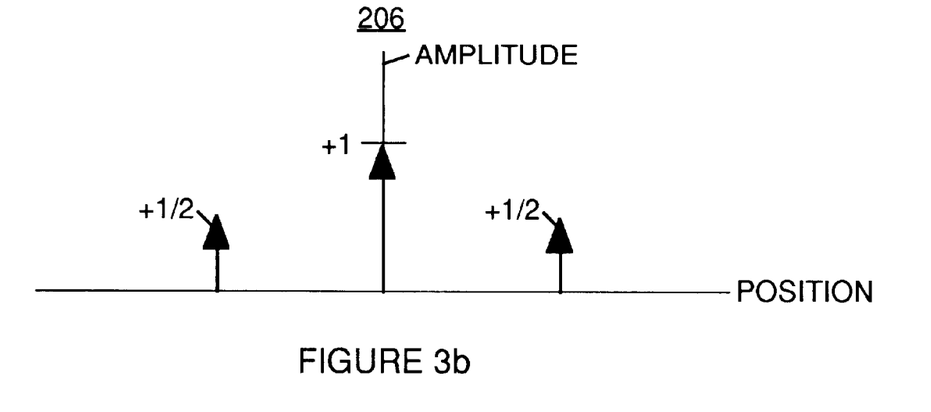
FIG. 3b shows the kernel function of a 3-tap low-pass filter.

Shown in FIG. 3a are the respective coefficients −¼, +½ and −¼ of the kernel function of each of the 3-tap digital filters comprising high-pass filter 200, which 3-tap digital filters are preferably employed for each of the horizontal and vertical image dimensions. Shown in FIG. 3b are the respective coefficients +½, +1 and +½ of the kernel function of each of the 3-tap digital low-pass filters used by 2D expand means 206, which 3-tap digital low-pass filters are preferably employed for each of the horizontal and vertical binary-mask dimensions. An alternative implementation of high-pass filter 200 employs prior-art pyramid or so-called filter-subtract-decimate (FSD) processing disclosed by Anderson et al. in the aforesaid U.S. Pat. No. 5,717,789). Further, while higher-order more selective filters could be substituted for each of the 3-tap digital filters of high-pass filter 200 and 2D expand means 206, the gain in improvement, if any, would be very minor. Further, the use of 3-tap filters has the advantages of being simpler and less expensive to implement in large-scale integrated (LSI) form.

Figure 4A:
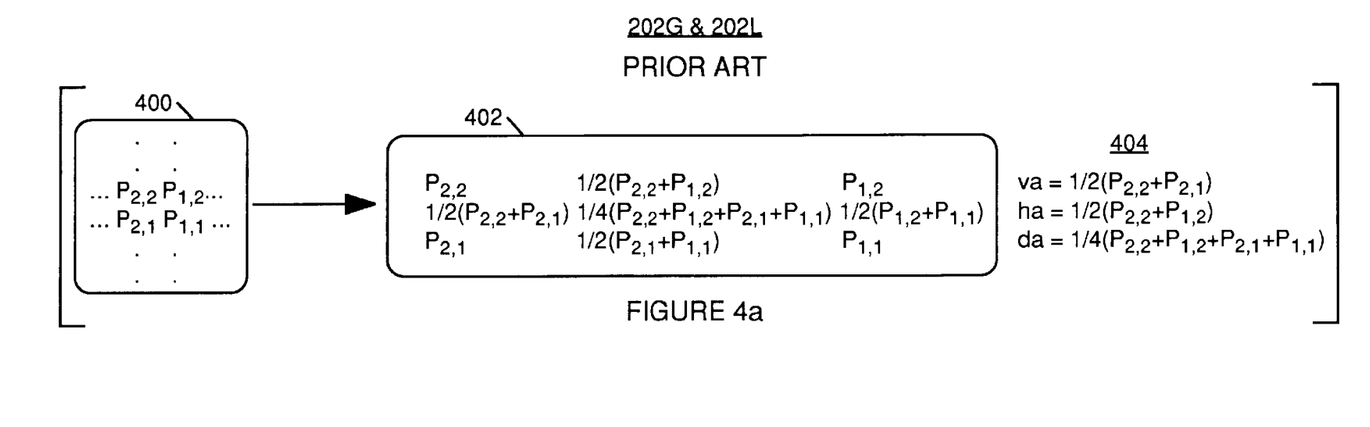
FIG. 4a diagrammatically shows the type of computational processing performed by a conventional 2D prior-art linear pixel interpolator and FIG. 4b diagrammatically shows the type of computational processing performed by the preferred embodiment of each of the Gaussian and Laplacian diagonal interpolators of FIG. 2.

Diagrammatically shown in FIG. 4a is the type of computational processing performed by a conventional 2D prior-art linear pixel interpolator which could be employed by diagonal interpolator 202G and/or diagonal interpolator 202L. Block 400 shows a 2D subset of 4 adjacent pixel values $P_{1,1}$, $P_{2,1}$, $P_{1,2}$ and $P_{2,2}$ of the input image applied to a diagonal interpolator. Block 402 shows that (1) the computed horizontal average pixel value $\frac{1}{2}(P_{2,2}+P_{1,2})$ is interpolated between the pixel values $P_{2,2}$ and $P_{1,2}$, (2) the computed horizontal average pixel value $\frac{1}{2}(P_{2,1}+P_{1,1})$ is interpolated between the pixel values $P_{2,1}$ and $P_{1,1}$, (3) the computed vertical average pixel value $\frac{1}{2}(P_{2,2}+P_{2,1})$ is interpolated between the pixel values $P_{2,2}$ and $P_{2,1}$, (4) the computed vertical average pixel value $\frac{1}{2}(P_{1,2}+P_{1,1})$ is interpolated between the pixel values $P_{1,2}$ and $P_{1,1}$ and (5) the computed diagonal average pixel value $\frac{1}{2}(P_{2,2}+P_{1,2}+P_{2,1}+P_{1,1})$ is centrally interpolated between all of both the aforesaid horizontal and vertical interpolated pixel values. As indicated by reference number 404, the interpolated vertical average (va) pixel value is let equal to $\frac{1}{2}(P_{2,2}+P_{2,1})$, the interpolated horizontal average (ha) pixel value is let equal to $\frac{1}{2}(P_{2,2}+P_{1,2})$ and the interpolated diagonal average (da) pixel value is let equal to $\frac{1}{4}(P_{2,2}+P_{1,2}+P_{2,1}+P_{1,1})$.

The fact is that any actual diagonal spatial information in the input image supplied to a diagonal interpolator will define an angular orientation that is either closer to a +45° direction than to a −45° direction or, alternatively, closer to a −45° direction than to a +45° direction. However, this angular-orientation component of the diagonal spatial information is completely lost in the above-described computation of the da pixel value by the computational processing performed by a conventional 2D prior-art linear pixel interpolator, thereby degrading to some extent the visual appearance of a displayed image that has been enlarged by such a conventional 2D prior-art linear pixel interpolator.

Figure 4B:
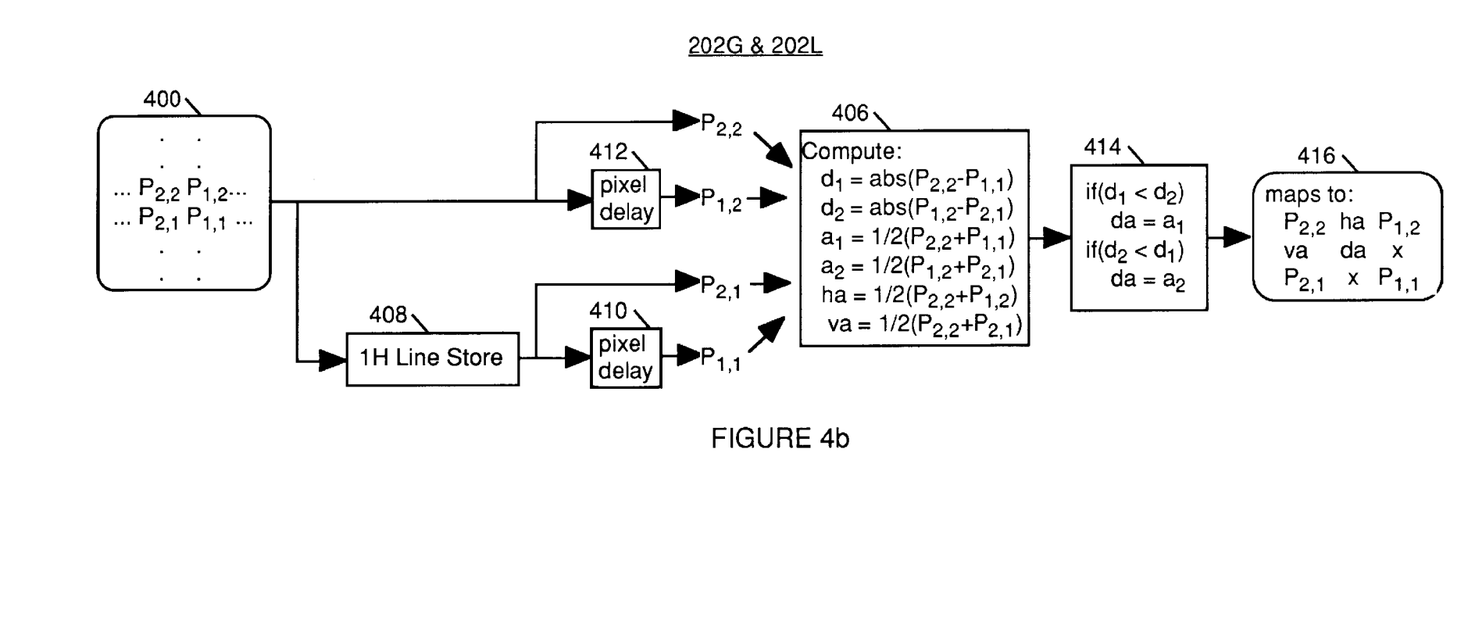

Diagrammatically shown in FIG. 4b is the type of computational processing performed by an embodiment of diagonal interpolator 202G and/or diagonal interpolator 202L which preserves and makes use of the angular-orientation component of the diagonal spatial information in the input image supplied to the diagonal interpolator, in accordance with principles of the present invention. The result is that the visual appearance of a displayed image that has been enlarged by the type of computational processing shown in FIG. 4b is significantly improved with respect to the visual appearance of a displayed image that has been enlarged by a conventional 2D prior-art linear pixel interpolator.

More specifically, in FIG. 4b, an ongoing stream of pixels applied as an input to a diagonal interpolator defines a 2D image that includes the subset of 4 adjacent pixel values $P_{1,1}$, $P_{2,1}$, $P_{1,2}$ and $P_{2,2}$ of block 400. As known in the art, pixel values $P_{1,1}$, $P_{2,1}$, $P_{1,2}$ and $P_{2,2}$ of this ongoing stream of pixels can be brought into temporal concurrence with one another at the input to compute block 406 by (1) passing pixel value $P_{1,1}$ through 1 horizontal (H) line store 408 and pixel delay 410, (2) ) passing pixel value $P_{2,1}$ only through 1 H line store 408, (3) passing pixel value $P_{1,2}$ only through pixel delay 412 and (4) applying pixel value $P_{2,2}$ directly as an input to compute block 406. The respective values computed in compute block 406 include the horizontal interpolation value ha and the vertical interpolation value va (which are identical to the corresponding values identified by reference number 404 of the above-described linear interpolator of FIG. 4a). However, respective values computed in compute block 406 also include $d_1$ (which is equal to the absolute value of $P_{2,2}-P_{1,1}$), $d_2$ (which is equal to the absolute value of $P_{1,2}-P_{2,1}$), $a_1$ (which is equal to $\frac{1}{2}(P_{2,2}+P_{1,1})$) and $a_2$ (which is equal to $\frac{1}{2}(P_{1,2}+P_{2,1})$). As block 414 shows, the computational processing of FIG. 4b includes logic means for assigning the diagonal interpolation value $da=a_1=\frac{1}{2}(P_{2,2}+P_{1,1})$, if $d_1$ is smaller than $d_2$, or, alternatively, assigning the diagonal interpolation value $da=a_2=\frac{1}{2}(P_{1,2}+P_{2,1})$, if $d_2$ is smaller than $d_1$. Block 416 of FIG. 4b shows how the interpolated pixel values ha, va and da map to the original pixel values $P_{1,1}$, $P_{2,1}$, $P_{1,2}$ and $P_{2,2}$ of block 400. The computation of each of the two interpolated pixel values designated "x" in block 416 depend on maps of earlier-occurring computations by compute block 406 (which are not shown in FIG. 4b).

Employing the above-described FIG. 4b embodiment of diagonal interpolator 202G and diagonal interpolator 202L makes a huge improvement in interpolated diagonal edges in the display of an enlarged image by dramatically reducing the visibility of the stairstepping which normally occurs in the display of a diagonal edge.

Figure 5A:
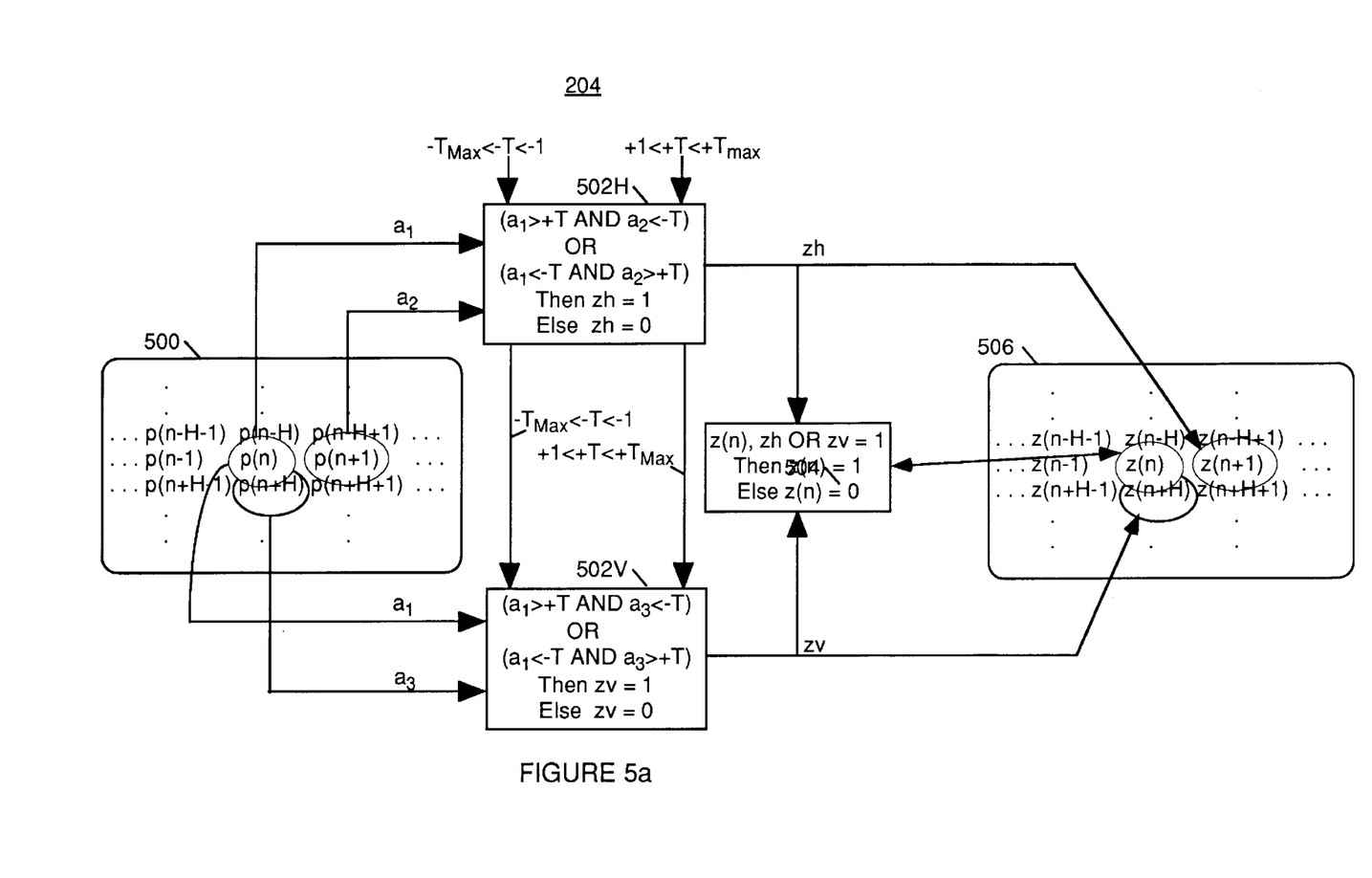
FIG. 5a diagrammatically shows the type of computations performed by the phase gapper of FIG. 2 and FIG. 5b diagrammatically shows an illustrative example of the pixel values applied as an input to the phase gapper of FIG. 2 and the corresponding pixel values derived as an output from the phase gapper of FIG. 2.

FIG. 5a is directed to the functionally-shown logical processing employed by phase gapper 204 for the purpose of determining and identifying the locations of those 2D pixels in the $L_0$ image, applied as an ongoing pixel stream input to phase gapper 204, at which edge information in the image is located. Block 500 of FIG. 5a shows a 3×3 subset of the 9 respective pixel values of the 2D pixels in the $L_0$ image input. This 3×3 subset centered on pixel p(n) extends from an earliest occurring pixel p(n–H–1) to a latest occurring pixel p(n+H+1). The computational processing operates sequentially from left-to-right horizontally and top-to-bottom vertically on successive corner-shaped groups of 3 pixels, as exemplified by circled pixels p(n), p(n+1) and p(n+H) of the current corner-shaped group being operated on. It is apparent that pixel p(n), besides being a member of this current corner-shaped group, is also a member of the corner-shaped group comprising pixels p(n–1), p(n) and p(n+H–1) that immediately precedes the current corner-shaped group, so that pixel p(n) in the preceding group occupies a position corresponding to the position of pixel p(n+1) of the current group.

More specifically, as shown in FIG. 5a, the algebraic value $a_1$ of pixel p(n) is applied, respectively, as a first input to each of horizontal logic block 502H and vertical logic block 502V. The algebraic value $a_2$ of pixel p(n+1) is applied as a second input to horizontal logic block 502H. The algebraic value $a_3$ of pixel p(n+H) is applied as a second input to vertical logic block 502V. A threshold –T having some selected amplitude between $-T_{Max}$ and –1 (which depends on the size of the assumed relatively low noise level included in the $L_0$ input image applied to phase gapper 204) is applied as a third input to each of horizontal logic block 502H and vertical logic block 502V. A threshold +T having some selected amplitude between +1 and $+T_{Max}$ (which also depends on the assumed relatively low noise level) is applied as a fourth input to each of horizontal logic block 502H and vertical logic block 502V). Typically, the value of the relatively low noise level is less than a $T_{Max}$ absolute value of 3.

Horizontal logic block 502H includes logic means for deriving a horizontal output zh therefrom that has a binary amplitude value of 1 only if either the amplitude of $a_1$ is larger than the threshold amplitude +T and the amplitude of $a_2$ is smaller than the threshold amplitude –T or, alternatively, the amplitude of $a_1$ is smaller than the threshold amplitude of –T and the amplitude of $a_2$ is larger than the threshold amplitude +T. Otherwise, the horizontal output zh derived by the logic means of horizontal logic block 502H has a binary amplitude value of 0. Similarly, vertical logic block 502V includes logic means for deriving a vertical output zv therefrom that has a binary amplitude value of 1 only if either the amplitude of $a_1$ is larger than the threshold amplitude +T and the amplitude of $a_3$ is smaller than the threshold amplitude –T or, alternatively, the amplitude of $a_1$ is smaller than the threshold amplitude –T and the amplitude of $a_3$ is larger than the threshold value +T. Otherwise, the vertical output zv derived by the logic means of vertical logic block 502V has a binary amplitude value of 0.

Further shown in FIG. 5a is logic block 504 and block 506. Block 506 shows a 3×3 subset of the 9 respective derived binary amplitude values of the 2D output pixels, that correspond to the above-described 3×3 subset of 9 input pixels of block 500, after these input pixels have been operated on by logic blocks 502H, 502V and 504. It is apparent that output pixel z(n), besides being a member of the circled current corner-shaped group of output pixels z(n), z(n+1) and z(n+H) of block 506 (which corresponds to the circled current corner-shaped group of input pixels p(n), p(n+1) and p(n+H) of block 500) is also a member of the corner-shaped group comprising output pixels z(n–1), z(n) and z(n+H–1) that immediately precedes the current corner-shaped group, where output pixel z(n) in the preceding group occupies a position corresponding to the position of output pixel z(n+1) of the current group.

As indicated in FIG. 5a by a double-ended arrow, the binary amplitude value of pixel z(n) that already has been determined by logic blocks 502H, 502V and 504 during operation of the preceding corner-shaped group of pixels is applied during operation of the current corner-shaped group of pixels as a first input to logic block 504. As further indicated in FIG. 5a by single-ended arrows, the binary amplitude value of the zh output from logic block 502H during operation of the current corner-shaped group of pixels both sets the binary amplitude value of pixel z(n+1) and is applied as a second input to logic block 504, while the binary amplitude value of the zv output from logic block 502V during operation of the current corner-shaped group of pixels both sets the binary amplitude value of pixel z(n+H) and is applied as a third input to logic block 504. Logic block 504 comprises an OR gate that during operation of the current corner-shaped group of pixels derives an output binary amplitude value that (1) resets the binary amplitude value of pixel z(n) to a binary amplitude value of 1 if any of the first, second or third inputs thereto has a binary amplitude value of 1 and (2) resets the binary value of pixel z(n) to a binary amplitude value of 0 only if all of the first, second or third inputs thereto have binary amplitude values of 0.

From the foregoing description of FIG. 5a of the operation of the computer processing that takes place, it is apparent that the output pixels of block 506 that have binary amplitude values of 1 are always derived either as pairs of adjacent horizontal output pixels or either as pairs of adjacent vertical output pixels or both.

A shift in the sign from plus to minus or, alternatively, from minus to plus of the algebraic value of pixel $a_1$ with respect to the algebraic value of pixel $a_2$ of the horizontal $L_0$ image pair applied as separate inputs to logic block 502H can either be due to the presence of a horizontal-scan edge of the $L_0$ image occurring therebetween or be due to relatively low-amplitude noise. Similarly, a shift in the sign from plus to minus or, alternatively, from minus to plus of the algebraic value of pixel $a_1$ with respect to the algebraic value of pixel $a_3$ of the vertical $L_0$ image pair applied as separate inputs to logic block 502V can either be due to the presence a vertical-scan edge of the $L_0$ image occurring therebetween or be due to relatively low-amplitude noise. By employing a threshold T having an absolute amplitude at least equal to that of this noise and employing only respective absolute amplitudes of pixels $a_1$, $a_2$ and $a_3$ that are higher than the absolute amplitude of threshold T, shifts in sign due to noise are eliminated and only shifts in sign due to the presence of valid edges will derive a binary amplitude value of 1 output from either logic block 502H or logic block 502V.

Figure 5B:
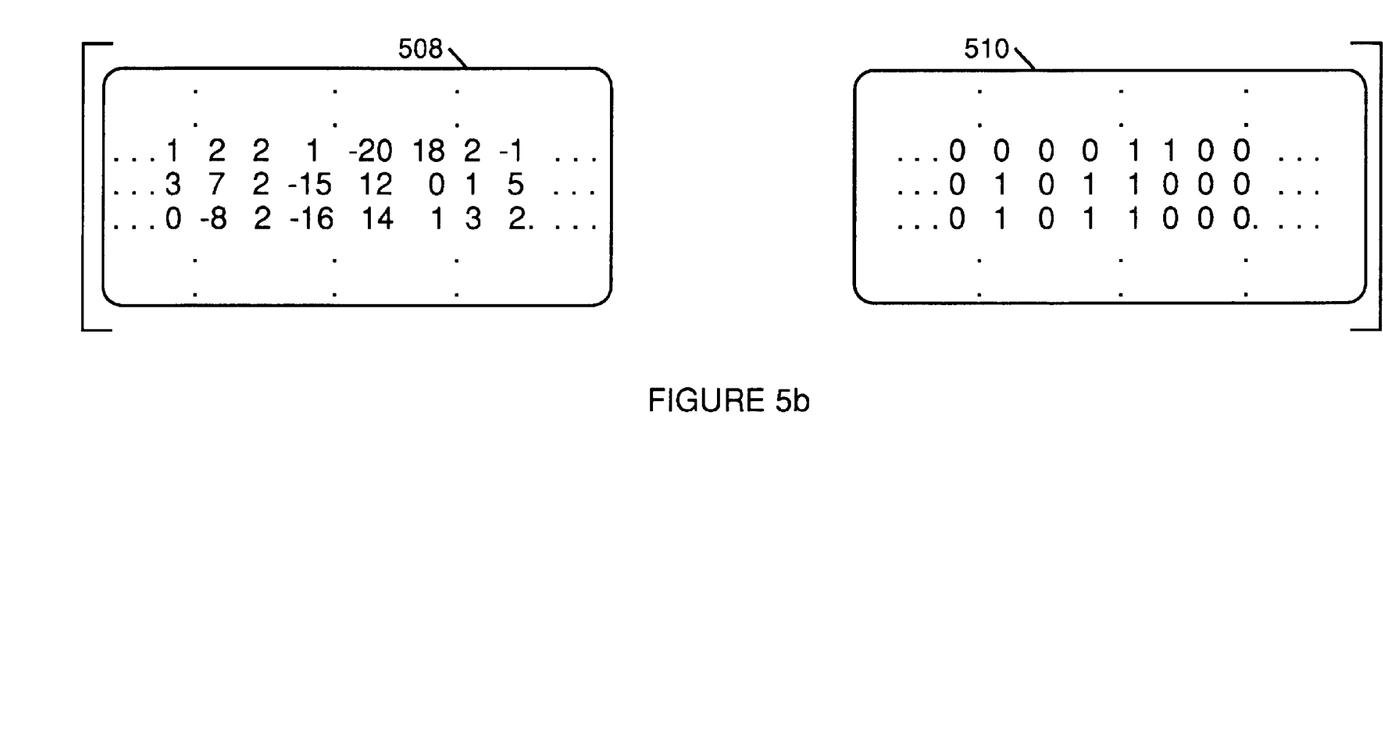

In this regard, reference is now made to FIG. 5b, which comprises (1) block 508 showing an example of an assortment of algebraic values of $L_0$ image-input pixels to phase gapper 204 and (2) block 510 showing a binary mask of computed output binary amplitude values from phase gapper 204 derived by operating on the assortment of algebraic values of $L_0$ image-input pixels of block 508 with logic blocks 502H, 502V and 504 of FIG. 5a, assuming that the amplitude of threshold T has a selected absolute value of 2. Thus, although there is a change in sign between respective block 508 horizontal adjacent pixels pairs having algebraic values 1&–20, 2&–1, 2&–15, 0&–8, –8&2 and 2&–16, together with vertical adjacent pixels pairs having algebraic values 1&–15 and –1&5, no respective block 510 corresponding binary output pixels having an amplitude value of 1 are derived in response thereto. However, respective block corresponding binary output pixels having an amplitude value of 1 are derived in response to a change in sign between respective block 508 horizontal adjacent pixels pairs having algebraic values −20&18, −15&12, 2&−15 and −16&14, together with a vertical adjacent pixel pair having algebraic values 7&−8, all of which have absolute values of amplitude higher than the assumed selected absolute value of 2 of the amplitude of threshold T.

2D expand means 206, which has the binary mask of computed output binary amplitude values from phase gapper 204 applied as an input thereto, preferably comprises cascaded horizontal and vertical 1D expand means. As known in the art, 1D expansion in pixel density by a factor of 2 in each of the horizontal and vertical directions of the binary mask may be achieved by inserting a zero-valued pixel between each pair of adjacent pixels in that direction followed by 1D low-pass filtering preferably by a 3-tap digital filter having the kernel-function coefficients of +½, 1 and +½ shown in above-described FIG. 3b. Since the pixel amplitude values of the binary mask are limited to only 1 and 0 amplitude values, the 1D low-pass filtering output in each of the horizontal and vertical directions is limited to the variable-amplitude wave shape values of 0, ½ and 1. Therefore, the 2D output of 2D expand means 206, which is equal to the cross product of the 1D low-pass filtering output in the horizontal direction and the 1D low-pass filtering output in the vertical direction, is limited to the variable-amplitude wave shape values of 0, ¼, ½ and 1. Other variable-amplitude wave shape values could work as well. However, the variable-amplitude wave shape values of 0, ¼, ½ and 1 derived by the employment of a separate 3-tap low-pass filter of FIG. 3b for each of the horizontal and vertical directions is both simple and the least costly to implement.

Returning to FIG. 2, after the value of each pixel of the $L'_0$ oversampled image output stream from diagonal interpolator 202L has been first multiplied by the corresponding pixel amplitude value of value of each pixel of the 2D expanded binary mask in multiplier 208, to thereby derive increased high-frequency content image $L_{-h1}$, and then multiplied by a particular gain-control factor in multiplier 210, to thereby derive altered high-frequency content image $L_{-h2}$, each resulting pixel value is operated on by a clipper function in amplitude clipper 212, to thereby derive further altered high-frequency content image $L_{-1}$. FIG. 6a is a graph of clipper output amplitude as a function of clipper input amplitude for the case in which the value of the gain-control factor employed by multiplier 210 is 1 (i.e., unity), whereby the high frequency content of image $L_{-h2}$ is the same as the high frequency content of image $L_{-h1}$. FIG. 6b is a graph of clipper output amplitude as a function of clipper input amplitude for the case in which the value of the gain-control factor employed by multiplier 210 is greater than unity, whereby the high frequency content of image $L_{-h2}$ is greater than the high frequency content of image $L_{-h1}$. FIG. 6a indicates that the amplitude slope within an input range of values from a threshold value of $-T_{-1}$ to a threshold value of $+T_{-1}$ is 45°, while outside of this input range the output value is the threshold value $-T_1$ for all negative input values and is the threshold value $+T_{-1}$ for all positive input values. FIG. 6b indicates that the amplitude slope within an input range of values from a threshold value of $-T_2$ to a threshold value of $+T_2$ is less than 45°, while outside of this input range the output value is the threshold value $-T_2$ for all negative input values and is the threshold value $+T_2$ for all positive input values. It has been found experimentally that both the gain factor and the threshold values change as a function of the input image size. Smaller input image sizes require smaller gain factors and higher thresholds; larger input image sizes require larger gains and lower thresholds. The $L_{-1}$ output image from amplitude clipper 212, which represents higher frequencies than in the original Gaussian input image $G_0$ and in the Laplacian image $L_0$ derived therefrom, can be thought of as comprising the next higher octave of resolution. Finally, corresponding pixel values of this $L_{-1}$ output image from amplitude clipper 212 and the $G'_0$ output image from diagonal interpolator 202G are added together in summer 214 to provide the enlarged $G_{-1}$ output image therefrom that constitutes the output from image zoom module 100-1.

Figure 7A:
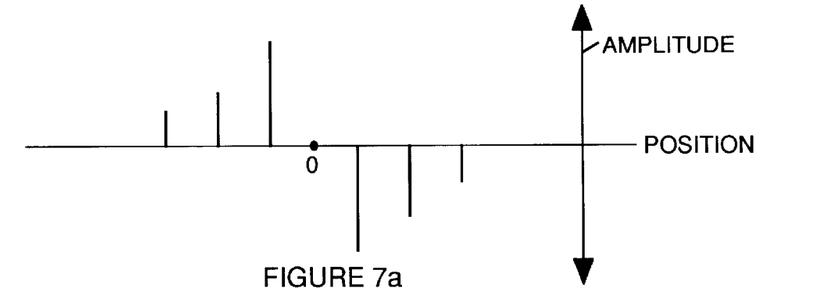
FIGS. 7a, 7b, 7c and 7d, respectively, are one-dimension (1D) graphs of amplitude as a function of pixel position surrounding an interpolated image edge for the output of (1) the Laplacian diagonal interpolator, (2) the phase gapper, (3) the 2D expander and (4) the amplitude clipper of FIG. 2.
Figure 7B:
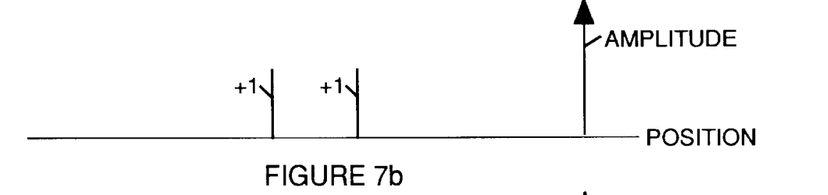
Figure 7C:
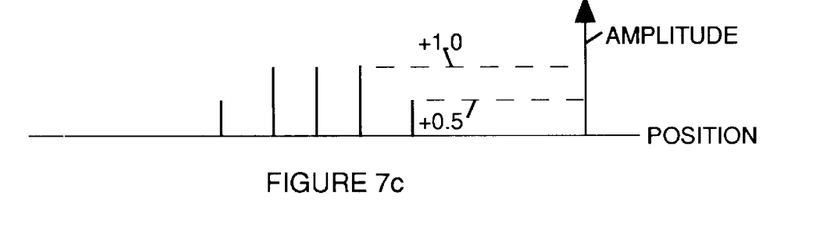
Figure 7D:
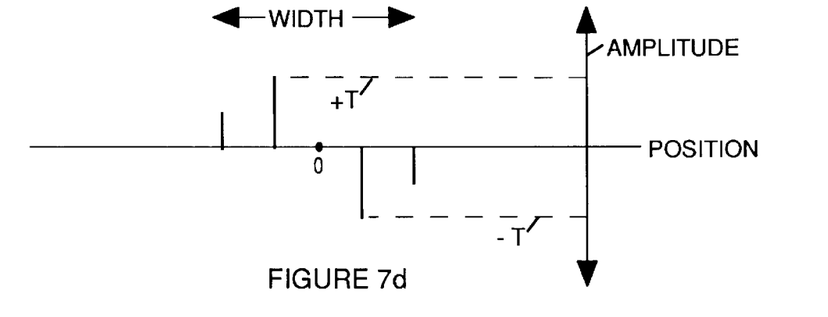

For illustrative purposes, the treatment of a 1D image edge oriented in a certain one of horizontal and vertical directions is indicated in the respective graphs of pixel amplitude as a function of pixel position shown in FIGS. 7a, 7b, 7c and 7d of the pixels surrounding that 1D image edge. Specifically, FIG. 7a is such a graph of the Laplacian edge-surrounding pixels at the output from diagonal interpolator 202L, which occur at the interpolated expanded pixel density of $L_{-1}$. As indicated in FIG. 7a, a zero-valued interpolated pixel amplitude represents the position of the edge itself. FIG. 7b is such a graph of the Laplacian edge-surrounding pair of adjacent +1 amplitude pixels of the binary mask output of phase gapper 204, which occur at the original pixel density of $L_0$. FIG. 7c is such a graph of the Laplacian edge-surrounding pixels at the output from 2D expand means 206, which occur at the interpolated expanded pixel density of $L_{-1}$. FIG. 7d is such a graph of the Laplacian edge-surrounding pixels at the output from amplitude clipper 212, which occur at the interpolated expanded pixel density of $L'_{-1}$ after the Laplacian edge-surrounding pixels of FIG. 7a at the output from diagonal interpolator 202L have been first multiplied by the Laplacian edge-surrounding pixels of FIG. 7c at the output from 2D expand means 206 in multiplier 208 and then multiplied by a gain-control factor in multiplier 210 and applied as the input to amplitude clipper 212.

As noted in FIG. 7d, the total width of the Laplacian edge-surrounding pixels is only 4 pixel periods at the expanded pixel density of $L'_{-1}$ that define a variable-amplitude wave shape. Further, assuming that only the 2 edge-surrounding pixels closest to the zero-valued edge had an amplitude that exceeds the absolute value of the threshold amplitude T, the amplitude of the left one of these 2 edge-surrounding pixels is clipped to a reduced positive value equal to +T and the amplitude of the right one of these 2 edge-surrounding pixels is clipped to a reduced negative value equal to −T.

Figure 8:
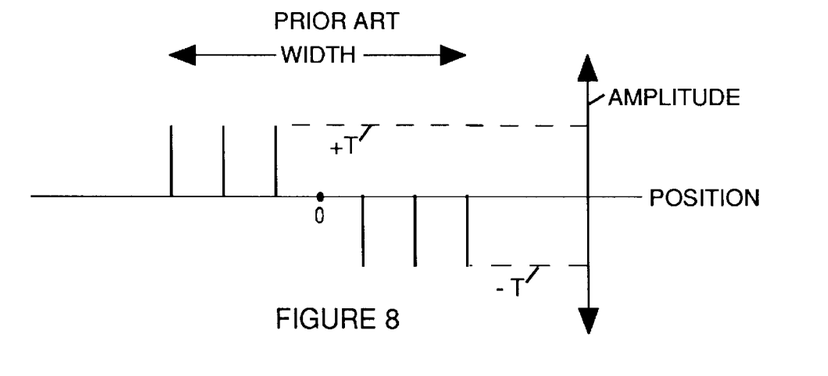
FIG. 8 is a 1D graph of amplitude as a function of pixel position surrounding an interpolated image edge of the edge-enhanced output image taught by the aforesaid prior-art Anderson et al. U.S. Pat. No. 5,717,789.

FIG. 8, which is directed to an example of 1D Laplacian edge-surrounding pixels at the expanded pixel density of $L_{-1}$ obtainable at the output of the aforesaid Anderson et al.'s phase-preserving non-linear filter, is shown in juxtaposed position with FIG. 7d on the same sheet of drawing for comparative purposes. As noted in FIG. 8, the total width of the Laplacian edge-surrounding pixels is 6 pixel periods at the expanded pixel density of $L_{-1}$ and that these Laplacian edge-surrounding pixels define a fixed-amplitude wave shape that varies only in sign from an amplitude-clipped positive threshold value +T to an amplitude-clipped negative threshold value −T. The wider 6-pixel-period wide image edge of Anderson et al's FIG. 8 produces a less perceptually natural looking display of the processed enlarged image that retains the "look and feel" of the original image than does the narrower 4-pixel-period wide image edge of the present invention's FIG. 7d. More important, however, is that the 6-pixel-period wide fixed-amplitude wave shape edge of Anderson et al's FIG. 8 introduces undesirable visible low-frequency artifacts in the display of the processed enlarged image, while the 4-pixel-period wide variable-amplitude wave shape of the present invention's FIG. 7d does- not introduce these undesirable visible low-frequency artifacts in the display of the processed enlarged image. Therefore, the above-described digital processing apparatus for variable image size enlargement with high-frequency bandwidth synthesis of the present invention has no need for a high-speed, high-memory filter which would have been required to remove such undesirable visible low-frequency artifacts had these artifacts been introduced.

While the present invention is primarily directed to the case of synthetically extending the bandwidth of the oversampled interpolated data stream of an enlarged image, there is also the case in which the original-image raster-scanned data stream input is substantially oversampled with respect to the highest frequency component of the original image. In this latter case, the structure shown in FIG. 2 of image zoom module 100-1 could be modified by (1) eliminating diagonal interpolators 202G and 202L, (2) replacing 2D expand means 205 with 2D means that include solely horizontal and vertical low-pass filters having suitable kernel-function coefficients for directly filtering the binary-mask output from phase gapper 204 and then applying the output of such 2D means as a multiplier input to multiplier 208, (3) directly applying the $L_O$ image output from high-pass filter 200 as a multiplicand input to multiplier 208 and (4) directly applying the $G_O$ original image input as an addend input to summer 214.

What is claimed is:

1. In digital image processing apparatus comprising at least one image zoom module responsive to a digital two-dimensional (2D) Gaussian input image having a certain pixel density in each dimension thereof and a first frequency bandwidth applied thereto for deriving a digital 2D Gaussian output image having twice said certain pixel density in each dimension thereof and a second frequency bandwidth which is wider than said first frequency bandwidth, the improved structure wherein each image zoom module comprises:

2D high-pass filter means responsive to pixels of said Gaussian input image being applied as an input thereto for deriving pixels of a first Laplacian image therefrom that has said certain pixel density in each dimension thereof and said first frequency bandwidth;

a first diagonal interpolator responsive to said pixels of said first Laplacian image being applied as an input thereto for deriving pixels of a second Laplacian image therefrom that has twice said certain pixel density in each dimension thereof and said first frequency bandwidth;

a phase gapper responsive to said pixels of said first Laplacian image being applied as an input thereto for deriving pixels of a binary-mask output therefrom that has said certain pixel density in which only an edge location in said first Laplacian image is defined by a pair of adjacent pixels of said binary-mask output having given non-zero amplitude values and all other locations in said first Laplacian image are defined by pixels of said binary mask output having zero amplitude values;

2D expand means including 2D low-pass filter means responsive to pixels of said binary-mask output being applied as an input thereto for deriving pixels of a 2D low-passed filtered output image therefrom having twice said certain pixel density in each dimension thereof;

pixel-processing means comprising a multiplier for multiplying the algebraic values of corresponding pixels of said second Laplacian image from said first diagonal interpolator and said 2D low-passed filtered output image from said 2D expand means for deriving a third Laplacian image having said second pixel density and said second frequency bandwidth;

a second diagonal interpolator responsive to pixels of said Gaussian input image having said first pixel density and said first frequency applied thereto for deriving a Gaussian image having said second pixel density and said first frequency bandwidth as an output therefrom; and a summer for adding the algebraic values of corresponding pixels of said third Laplacian image having said second pixel density and said second frequency bandwidth from said pixel-processing means and said Gaussian image having said second pixel density and said first frequency bandwidth from said second diagonal interpolator to derive the corresponding pixels of said 2D Gaussian output image having twice said certain pixel density in each dimension thereof and said second frequency bandwidth as the sum output from said summer.

2. The image processing apparatus defined in claim 1, wherein said pixel-processing means further comprises:

a second multiplier for multiplying the algebraic value of each pixel of the product output from said first-mentioned multiplier by a given gain-control factor; and an amplitude clipper for limiting the most positive amplitude value of each pixel of the product output from second multiplier to an amplitude value no more positive than that of a particular positive threshold value and limiting the most negative amplitude value of each pixel of the product output from second multiplier to an amplitude value no more negative than that of a particular negative threshold value;

whereby an output from said amplitude clipper constitutes said third Laplacian output image having said second pixel density and said second frequency bandwidth.

3. The image processing apparatus defined in claim 1, wherein:

said 2D high-pass filter means comprises separable 1D horizontal and vertical digital 3-tap high-pass filters, each of which is defined, by kernel-function coefficient-values of $-\frac{1}{2}$, $+1$ and $-\frac{1}{2}$; and said 2D low-pass filter means comprises separable 1D horizontal and vertical digital 3-tap low-pass filters, each of which is defined by kernel-function coefficient-values of $+\frac{1}{2}$, $+1$ and $+\frac{1}{2}$.

4. The image processing apparatus defined in claim 1, wherein at least one of said first and second diagonal interpolators comprises:

first compute means operating on the image pixels applied as an input thereto for (1), computing the absolute value of the difference in algebraic pixel values of a first of, two corresponding pairs of adjacent pixels that is diagonally oriented at a +45° angle with respect to the horizontal image dimension and (2) computing the absolute value of the algebraic difference in pixel values of a second of said two corresponding pairs of adjacent pixels that is diagonally oriented at a −45° angle with respect to the horizonal image dimension;

logic means for comparing the computed absolute values of said first and second pairs of adjacent pixels to one another to determine which one the first and second pairs of adjacent pixels has the smaller computed absolute value; and second compute means for deriving a computed interpolated pixel, for use in the output image from that diagonal interpolator, that has an algebraic value equal to the average of the algebraic pixel values of that one the first and second pairs of adjacent pixels that has the smaller computed absolute value.

5. The image processing apparatus defined in claim 4, wherein each of said first and second diagonal interpolators comprises said first compute means, said logic means and said second compute means.

6. The image processing apparatus defined in claim 1, wherein said phase gapper comprises first, second and third logic means for deriving the pixel amplitude values of said binary mask output pixels therefrom in accordance with the algebraic values of said first Laplacian image input thereto and wherein:

said first logic means operates sequentially on the algebraic values of first and second adjacent horizontally-oriented pixels of successively-occurring corner-shaped groups of said first, said second and third adjacent pixels of said first Laplacian image for deriving said given non-zero amplitude value for the second adjacent pixel of a corresponding successively-occurring corner-shaped group of said binary mask output pixels only if said first pixel has a more positive value than a given positive threshold value AND said second pixel has more negative value than a given negative threshold value OR said first pixel has a more negative value than a given negative threshold value AND said second pixel has a more positive value than a given positive threshold value, and otherwise said first logic means derives a zero amplitude value for the second adjacent pixel of said corresponding corner-shaped group of said binary mask output pixels; said second logic means operates sequentially on the algebraic values of first and third adjacent vertically-oriented pixels of successively-occurring corner-shaped groups of said first, said second and third adjacent pixels of said first Laplacian image for deriving said given non-zero amplitude value for the third adjacent pixel of a corresponding successively-occurring corner-shaped group of said binary mask output pixels only if said first pixel has a more positive value than a given positive threshold value AND said third pixel has a more negative value than a given negative threshold value OR said first pixel has a more negative value than a given negative threshold value AND said third pixel has a more positive value than a given positive threshold value, and otherwise said second logic means derives a zero amplitude value for the third adjacent pixel of said corresponding corner-shaped group of said binary mask output pixels; and said third logic means deriving said given non-zero amplitude value for the first adjacent pixel of said current corresponding corner-shaped group of said binary mask output pixels in response to the value for the second adjacent pixel of said corresponding successively-occurring corner-shaped group of said binary mask output pixels currently derived by said first logic means being said given non-zero amplitude value OR the value; for the third adjacent pixel of said corresponding successively-occurring corner-shaped group of said binary mask output pixels currently derived by said second logic means being said given non-zero amplitude value OR the value of the first adjacent pixel of said current corresponding corner-shaped group of said binary mask output pixels already having said given non-zero amplitude value due to a second or third adjacent pixel of an immediately preceding corresponding successively-occurring corner-shaped group of said binary mask output pixels having had said given non-zero amplitude value.

7. The image processing apparatus defined in claim 6, wherein:

said given negative threshold value has a value between $-T_{Max}$ and −1 and said given positive threshold value has a value between +1 and $+T_{Max}$; and said given non-zero amplitude is +1.

8. The image processing apparatus defined in claim 1, wherein said apparatus comprises:

an ordinally-arranged series of cascaded image zoom modules 1 to K, where K is a plural integer, wherein (1) image zoom module 1 is responsive to an original digital 2D Gaussian image having a certain pixel density in each dimension thereof and a first frequency bandwidth, applied as an input thereto for deriving a digital 2D Gaussian output image therefrom having twice said certain pixel density in each dimension thereof and a second frequency bandwidth which is wider than said first frequency bandwidth (2) each of image zoom modules 2 to K has the digital 2D Gaussian output image from the immediately preceding one of the image zoom modules of said ordinally-arranged series applied as a digital 2D Gaussian image input thereto, (3) the digital 2D Gaussian output image from image zoom module K constitutes an output from said ordinally-arranged series of cascaded image zoom modules, and (4) each of said image zoom modules 1 to K comprises said improved structure.

9. The image processing apparatus defined in claim 8, wherein said apparatus further comprises:

variable filter/downsampler means responsive to a selected one the digital 2D Gaussian output images from cascaded image zoom modules 1 to K applied as an input thereto for deriving a digital 2D Gaussian output image having a pixel density in each dimension thereof which is between ½ and 1 times the pixel density in each dimension of said selected one the digital 2D Gaussian output images.

10. A diagonal interpolator responsive to a digital two-dimensional (2D) image having a certain pixel density in each dimension thereof applied as an input thereto for deriving a digital 2D image having twice said certain pixel density in each dimension thereof as an output therefrom, wherein said diagonal interpolator comprises:

first compute means operating on the pixels of said image applied as an input thereto for (1) computing the absolute value of the difference in algebraic pixel values of a first of two corresponding pairs of adjacent pixels that is diagonally oriented at a +45° angle with respect to the horizontal image dimension and (2) computing the absolute value of the algebraic difference in pixel values of a second of said two corresponding pairs of adjacent pixels that is diagonally oriented at a −45° angle with respect to the horizontal image dimension;

logic means for comparing the computed absolute values of said first and second pairs of adjacent pixels to one another to determine which one the first and second pairs of adjacent pixels has the smaller computed absolute value; and second compute means for deriving a computed interpolated pixel, for use in the output image from that diagonal interpolator; that has an algebraic value equal to the average of the algebraic pixel values of that one the first and second pairs of adjacent pixels that has the smaller computed absolute value.

11. In a phase gapper responsive to a digital two-dimensional (2D) Laplacian image having a certain pixel density in each dimension thereof applied as an input thereto for deriving pixels of a binary-mask output therefrom that has said certain pixel density in which only an edge location in said Laplacian image is defined by a pair of adjacent pixels of said binary-mask output having given non-zero amplitude values and all other locations in said Laplacian image are defined by pixels of said binary mask output having zero amplitude values, the improvement wherein said phase gapper comprises first, second and third logic means for deriving the pixel amplitude values of said binary mask output pixels there from in accordance with the algebraic values of said Laplacian image input thereto and wherein:

said first logic means operates sequentially on the algebraic values of first and second adjacent horizontal-oriented pixels of successively-occurring corner-shaped groups of said first, said second and third adjacent pixels of said Laplacian image for deriving said given, non-zero amplitude value for the second adjacent pixel of a corresponding sucessively-occurring corner-shaped group of said binary mask output pixels only if said first pixel has a more positive value than a given positive threshold value AND said second pixel has a more negative value than a given negative threshold value OR said first pixel has a more negative value than a given negative threshold value AND said second pixel has a more positive value than a given positive threshold value, and otherwise said first logic means derives a zero amplitude value for the second adjacent pixel of said corresponding corner-shaped group of said binary mask output pixels;

said second logic means operates sequentially on the algebraic values of first and third adjacent vertically-oriented pixels of successively-occurring corner-shaped groups of said first, said second and third adjacent pixels of said Laplacian image for deriving said given non-zero amplitude value for the third adjacent pixel of a corresponding successively-occurring corner-shaped group of said binary mask output pixels only if said first pixel has a more positive value than a given positive threshold value AND said, third pixel has a more negative value than a given negative threshold value OR said first pixel has a more negative value than a given negative threshold value AND said third pixel has a more positive value than a given positive threshold value, and otherwise said second logic means derives a zero amplitude value for the third adjacent pixel of said corresponding corner-shaped group of said binary mask output pixels; and said third logic means deriving said given non-zero amplitude value for the first adjacent pixel of said current corresponding corner-shaped group of said binary mask output pixels in response to the value for the second adjacent pixel of said corresponding successively-occurring corner-shaped group of said binary mask output pixels currently derived by said first logic means being said given non-zero amplitude value OR the value for the third adjacent pixel of said corresponding successively-occurring corner-shaped group of said binary mask output pixels currently derived by said second logic means being said given non-zero amplitude value OR the value of the first adjacent pixel of said current corresponding corner-shaped group of said binary mask output pixels already having said given non-zero amplitude value due to a second or third adjacent pixel of an immediately preceding corresponding successively-occurring corner-shaped group of said binary mask output pixels having had said given non-zero amplitude value.

12. The image processing apparatus defined in claim 11, wherein:

said given negative threshold value has a value between $-T_{Max}$ and $-1$ and said given positive threshold value has a value between $+1$ and $+T_{Max}$; and said given non-zero amplitude is $+1$.

13. In digital image processing apparatus responsive to a digital two-dimensional (2D) Gaussian input image having a first pixel density and a first frequency bandwidth applied thereto for deriving a digital 2D Gaussian output image having a second pixel density and a second frequency bandwidth which is wider than said first frequency bandwidth, the improvement wherein said apparatus comprises:

first means responsive to said Gaussian input image for deriving a Laplacian image having said second pixel density and said first frequency bandwidth;

second means including a phase gapper responsive to any edge-defining pixels in said Gaussian input image for deriving a binary mask image is defined by a pair of adjacent pixels of said binary mask having a given non-zero amplitude value and all other locations in the input image are defined by pixels of said binary mask having zero amplitude values;

third means responsive to pixels of said binary mask applied as an input thereto for deriving a low-pass filtered output therefrom at said second pixel density;

fourth means comprising a multiplier for multiplying corresponding pixels of said Laplacian image from said first means and said low-pass filtered output from said third means for deriving a Laplacian output image having said second pixel density and said second frequency band width; and fifth means responsive to pixels of said Gaussian input image having said first pixel density and said first frequency bandwidth and pixels of said Laplacian output image from said fourth means having said second pixel density and said first frequency bandwidth for deriving said Gaussian output image having said second pixel density and said second frequency bandwidth as an output therefrom.

14. The image processing apparatus defined in claim 13, wherein:

said input image having said first pixel density and said first frequency bandwidth is oversampled; and said second pixel density of said output image, which has said wider second frequency bandwidth which than said first frequency bandwidth, is substantially equal to said first pixel density.

* * * * *